(12) United States Patent
Asik et al.

(10) Patent No.: US 11,499,664 B2
(45) Date of Patent: Nov. 15, 2022

(54) METHOD OF MASKING A HOLE IN A PART

(71) Applicant: Custom Fabricating & Supplies, Franklin, WI (US)

(72) Inventors: Henry Asik, New Berlin, WI (US); Brian Asik, Franklin, WI (US)

(73) Assignee: Custom Fabricating & Supplies, Franklin, WI (US)

( * ) Notice: Subject to any disclaimer, the term of this patent is extended or adjusted under 35 U.S.C. 154(b) by 0 days.

(21) Appl. No.: 17/175,842

(22) Filed: Feb. 15, 2021

(65) Prior Publication Data
US 2021/0164599 A1    Jun. 3, 2021

Related U.S. Application Data

(62) Division of application No. 15/402,692, filed on Jan. 10, 2017, now Pat. No. 10,995,895.

(51) Int. Cl.
*F16L 55/11* (2006.01)

(52) U.S. Cl.
CPC .................. *F16L 55/1108* (2013.01)

(58) Field of Classification Search
CPC .................................................. F16L 55/1108
See application file for complete search history.

(56) References Cited

U.S. PATENT DOCUMENTS

| | | |
|---|---|---|
| 3,245,096 A | 4/1966 | McKay |
| 3,812,757 A | 5/1974 | Reiland |
| 3,921,364 A | 11/1975 | Briles |
| 4,171,209 A | 10/1979 | Brown |
| 6,003,557 A * | 12/1999 | Brelig ............... F16L 55/136 138/89 |
| 7,427,181 B2 | 9/2008 | Denton et al. |
| 7,631,664 B1 * | 12/2009 | Mailand ............ F16L 55/1108 138/89 |
| 2002/0127079 A1 | 9/2002 | Kersten |
| 2003/0219328 A1 | 11/2003 | Schultz |
| 2006/0115343 A1 | 6/2006 | Hartney et al. |
| 2015/0023753 A1 | 1/2015 | Dostinov et al. |
| 2015/0190836 A1 * | 7/2015 | Deck ................. B05B 12/26 156/293 |
| 2017/0333934 A1 * | 11/2017 | Le Do ................ C23C 4/02 |
| 2019/0105680 A1 * | 4/2019 | Warner .............. B05B 12/26 |

FOREIGN PATENT DOCUMENTS

| | | |
|---|---|---|
| CN | 203258352 | 10/2013 |
| CN | 204851930 | 12/2015 |

* cited by examiner

*Primary Examiner* — Nirvana Deonauth
(74) *Attorney, Agent, or Firm* — Boyle Fredrickson, S.C.

(57) ABSTRACT

A masking plug is provided for masking a hole in a part during a finishing operation. The masking plug includes an elongated shaft a first end terminating at a terminal surface and a second end. An outer surface of the shaft has external threads adjacent the first end thereof adapted for receipt in the hole. An enlarged body has a first end operatively connected to the shaft and a second operatively connected to a head. The diameter of the body is greater than the diameter of the shaft. The head has a polygonal configuration and is adapted for forming a mating relationship with a tool. The terminal surface of the shaft includes a hollow cavity formed therein which is configured to urge the outer surface of shaft radially outward in response to a pressure buildup in the cavity during the finishing operation so as to maintain the shaft in hole.

9 Claims, 4 Drawing Sheets

METHOD OF MASKING A HOLE IN A PART

CROSS-REFERENCE TO RELATED APPLICATION

This application is a divisional of US application Ser. No. 15/402,692, filed Jan. 10, 2017, the entirety of which is incorporated herein.

FIELD OF THE INVENTION

This invention relates generally to masking plugs for finishing operations, and in particular, to a masking plug configured protect a selected portion of a part and to withstand an enhanced air pressure buildup within the part during a finishing operation.

BACKGROUND AND SUMMARY OF THE INVENTION

As is known, masking plugs are typically used to mask a portion of an area of a part during finishing operation. More specifically, it is often desirable to protect certain portions of a part, e.g, threaded holes, pipe fittings, precisely machined surfaces and the like, which may incur damage or be rendered unsuitable for their intended purpose during a finishing operation. In order to protect the desired portion of the part, such as a threaded hole, the masking plug is threaded into the threaded hole prior to initiation of the finishing operation so as to protect the threads during the operation.

It has been found that traditional masking plugs have limitations that may make their use unacceptable. For example, during a conventional finishing operation, the part to be finished is submerged into a liquid tank and heated. As the part is heated, the pressure of the trapped air within the part increases. Traditional masking plugs have a history of blowing out or being ejected from the threaded hole in the part due to this increase in pressure. Once a masking plug has been ejected from the threaded hole, it can be appreciated that the masking plug no longer acts to protect threads defining the threaded hole in the part during the finishing operation, thereby rendering the part potentially unsuitable for its intended purpose.

Further, traditional masking plugs include threaded portions on the distal ends thereof to facilitate the threading of the masking plugs into corresponding threaded holes in the parts to be finished. Typically, each masking plug must be manually threaded into the threaded hole in the part. It can be appreciated that the repeated motion of an installer's hand and wrist that occurs when installing and/or removing the masking plugs from the part may lead to injury.

Therefore, it is primary object and feature of the present invention to provide a masking plug that is configured to protect a selected portion of a part and to withstand an enhanced air pressure buildup within the part during a finishing operation.

It is a further object and feature of the present invention to provide a masking plug that may be easily inserted and removed from a threaded hole without requiring the repeated motion of an installer's hand and wrist.

It is a still further object and feature of the present invention to provide a masking plug that is simple and inexpensive to manufacture.

In accordance with the present invention, a masking plug is provided. The masking plug includes an elongated shaft having an outer surface, a first end terminating at a terminal surface and a second end. The outer surface of the shaft has external threads adjacent the first end thereof. A head is operatively connected to the second end of the shaft. The terminal surface of the shaft includes a hollow cavity formed therein.

By way of example, the hollow cavity has a generally conical configuration. The cavity has a base coplanar with the terminal surface and an apex disposed within the shaft at a location spaced from the first end. Alternatively, the hollow cavity has a first end having a first diameter and a second end spaced from the first end of the shaft having a second diameter. The second diameter is less than the first diameter. It is contemplated for the shaft to extend along an axis and for the hollow cavity to be centered about the axis.

The outer surface of the head may have a hexagonal configuration and being configured to form a mating relationship with a tool. An enlarged body has a first end operatively connected to the shaft and a second operatively connected to the head. The shaft, the head and the body have corresponding diameters. The diameter of the body is greater than the diameter of the shaft and is greater than the diameter of the head.

In accordance with a further aspect of the present invention, a masking plug is provided. The masking plug includes an elongated shaft having an outer surface defining a diameter of the shaft, a first end terminating at a terminal surface and a second end. The outer surface of the shaft has external threads adjacent the first end. A head has an outer surface. The outer surface of the head has a polygonal configuration and is adapted for forming a mating relationship with a tool. An enlarged body has a diameter, a first end operatively connected to the shaft and a second operatively connected to the head. The diameter of the body is greater than the diameter of the shaft. The terminal surface of the shaft includes a hollow cavity formed therein.

By way of example, the hollow cavity has a generally conical configuration. The cavity has a base coplanar with the terminal surface and an apex disposed within the shaft at a location spaced from the first end of the shaft. Alternatively, the hollow cavity has a first end having a first diameter and a second end spaced from the first end of the shaft having a second diameter. The second diameter is less than the first diameter. It is contemplated for the shaft to extend along an axis and for the hollow cavity to be centered about the axis. The outer surface of the head may have a hexagonal configuration and being configured to form a mating relationship with a tool. The diameter of the body is greater than the diameter of the head.

In accordance with a still further aspect of the present invention, a method of masking a hole in a part during a finishing operation is provided. The method includes the step of threading a shaft having an outer surface with external thread thereon into the part. The shaft extends along an axis and has a terminal surface formed at a first end thereof. A cavity is provided in the terminal surface of the shaft such that the outer surface of shaft is urged radially outward from the axis in response to a pressure buildup in the cavity during the finishing operation so as to maintain the shaft in hole.

By way of example, the hollow cavity may have a generally conical configuration. The cavity has a base coplanar with the terminal surface and an apex disposed within the shaft at a location spaced from the first end of the shaft. Alternatively, the hollow cavity has a first end having a first diameter and a second end spaced from the first end of the shaft having a second diameter. The second diameter is less than the first diameter. It is contemplated for the shaft to extend along an axis and for the hollow cavity to be centered about the axis. The outer surface of the head may have a hexagonal configuration and being configured to form a mating relationship with a tool. The diameter of the body is greater than the diameter of the head.

It is contemplated to operatively connect a head to a second end of the shaft. The head includes an outer surface having a hexagonal configuration and being configured to form a mating relationship with a tool. A second end of the shaft may be interconnected to the head with an enlarged body. The body has a diameter greater than a diameter of the shaft and a diameter of the head.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1:
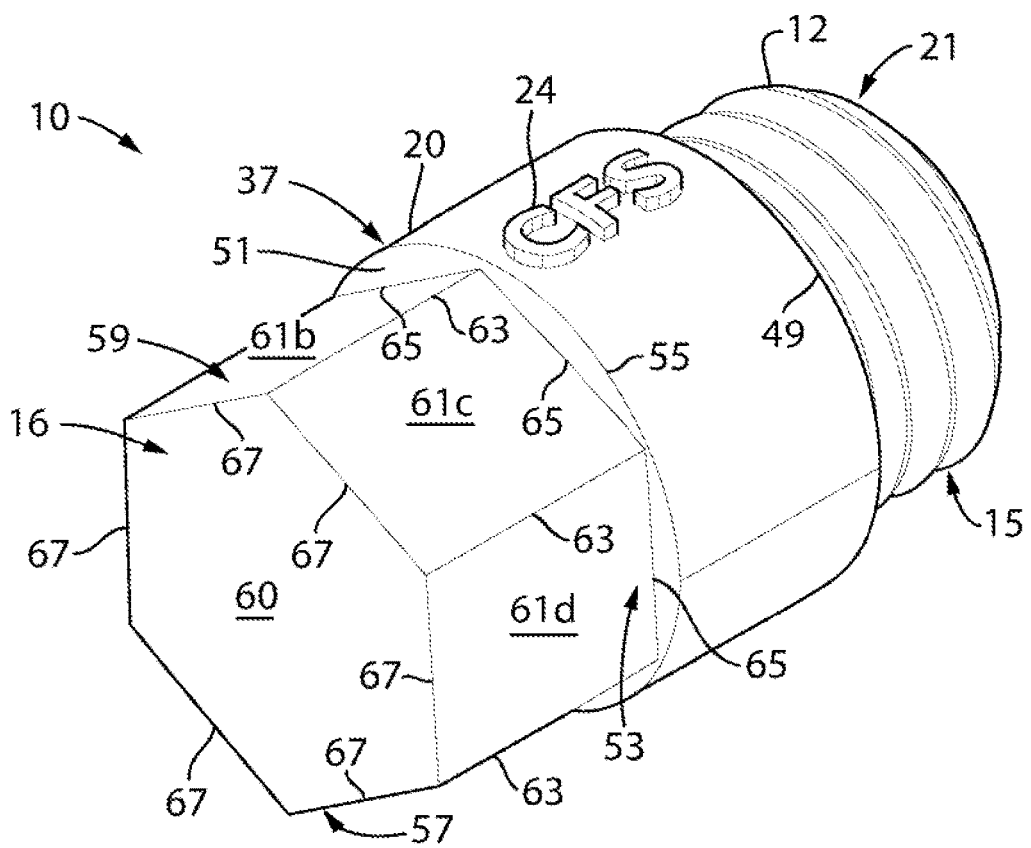
FIG. 1 is a perspective view of a masking plug in accordance with the present in, according to an embodiment of the invention.
Figure 2:
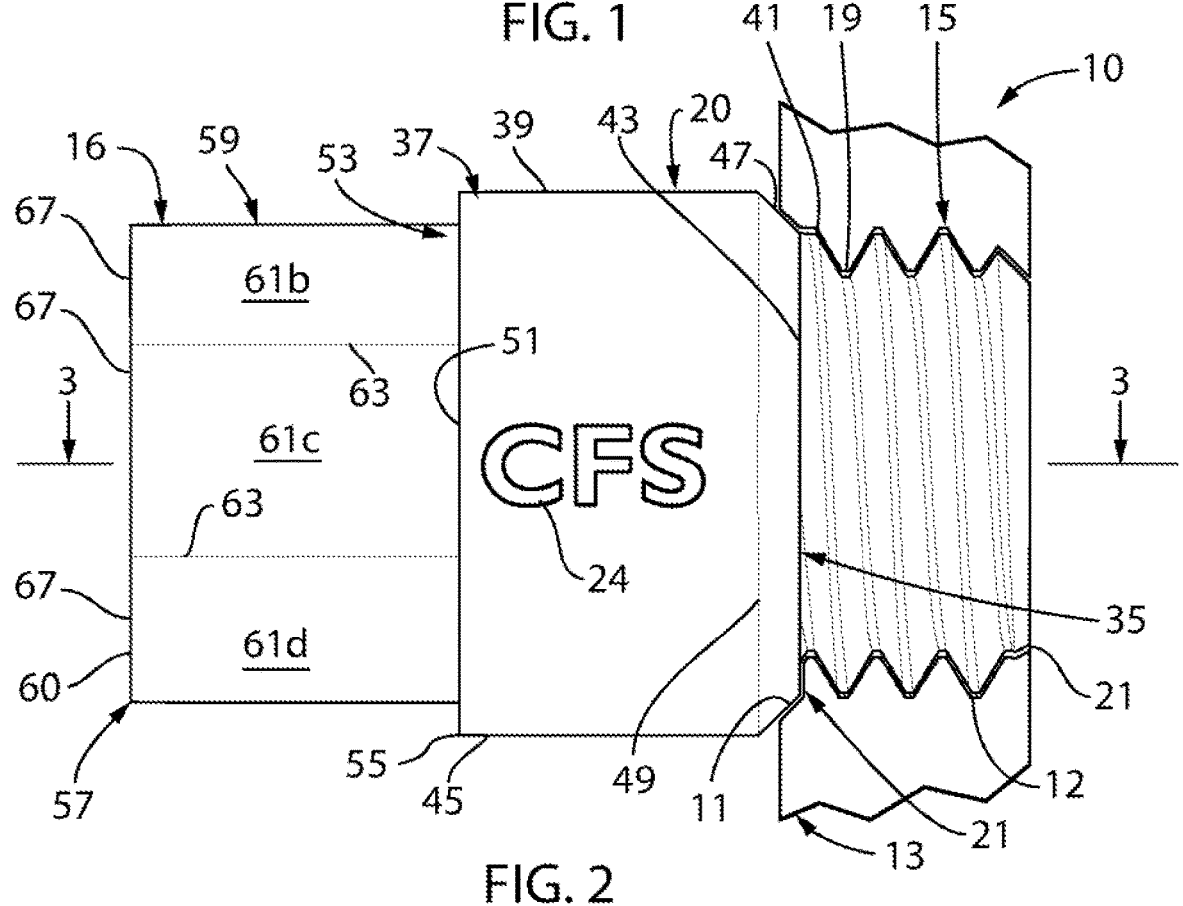
FIG. 2 is a side elevational view of the masking plug of FIG. 1.

Referring to FIGS. 1-7, a masking plug 10 in accordance with the present invention is generally designated by the reference numeral 10. As hereinafter described, it is intended for masking plug 10 to be receivable in a threaded opening 11 of part 13. FIG. 2, so as to prevent damage to part 13 or render part 13 unsuitable for its intended purpose in response to a finishing operation. Plug 10 includes an elongated shaft 15 extending along an axis 17 and having an outer surface 19. Outer surface 19 has a generally cylindrical configuration and includes threads 12 extending between first and second ends 21 and 23, respectively, thereof to form a circular helix. Threads 12 along shaft 15 are adapted for forming a mating relationship with threaded opening 11 in part 13, for reasons hereinafter described. It is contemplated for threads 12 to be either coarse or fine and to be sized appropriately to facilitate the forming of the mating relationship between masking plug 10 and threaded opening 11 in part 13.

Figure 3:
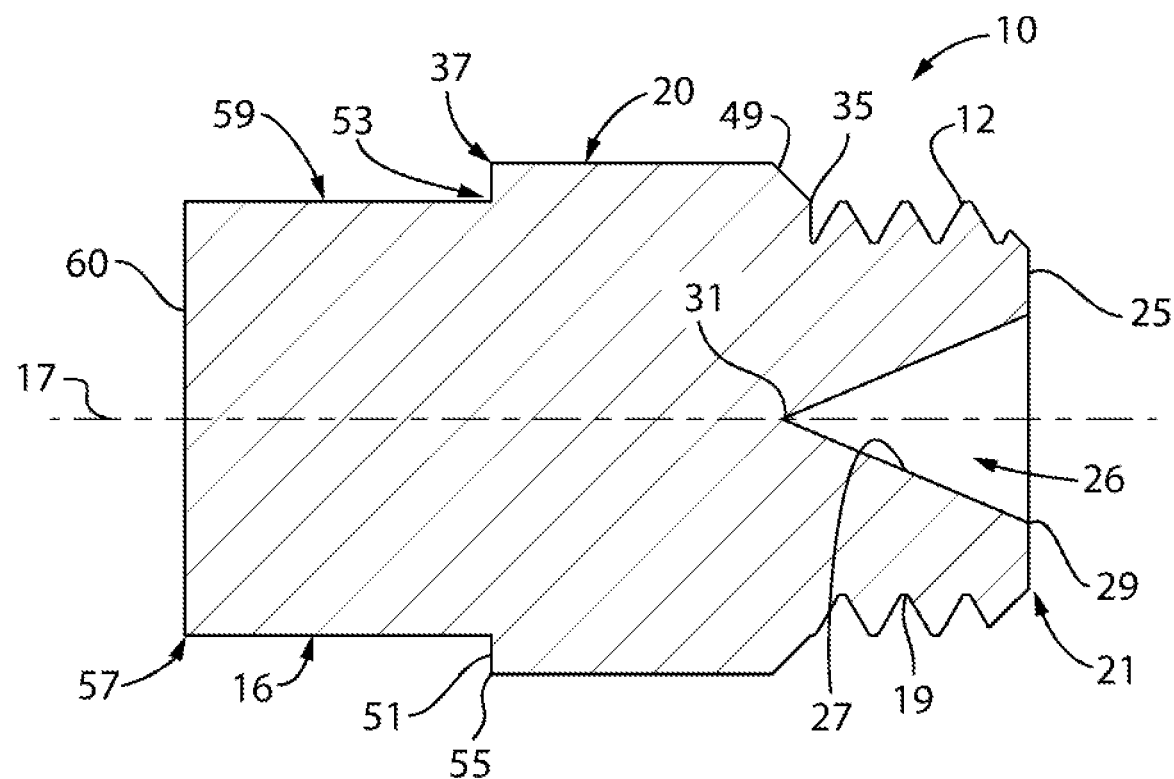
FIG. 3 is a cross-sectional view of the masking plug of the present invention taken along line 3-3 of FIG. 2.
Figure 4:
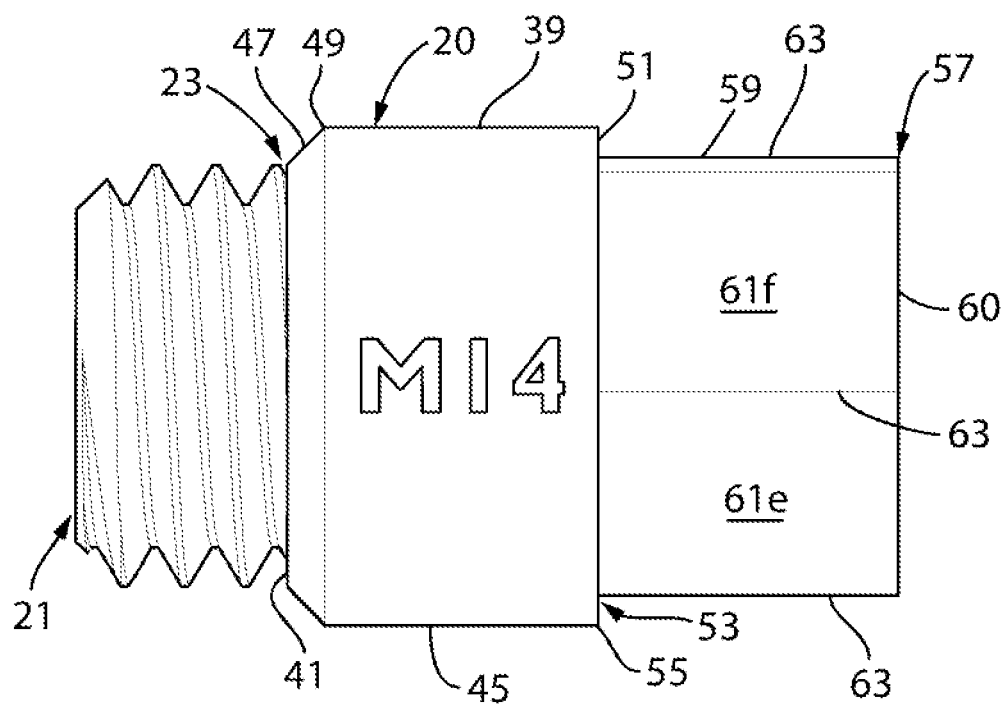
FIG. 4 is a side elevational view of a first side of the masking plug of the present invention.
Figure 5:
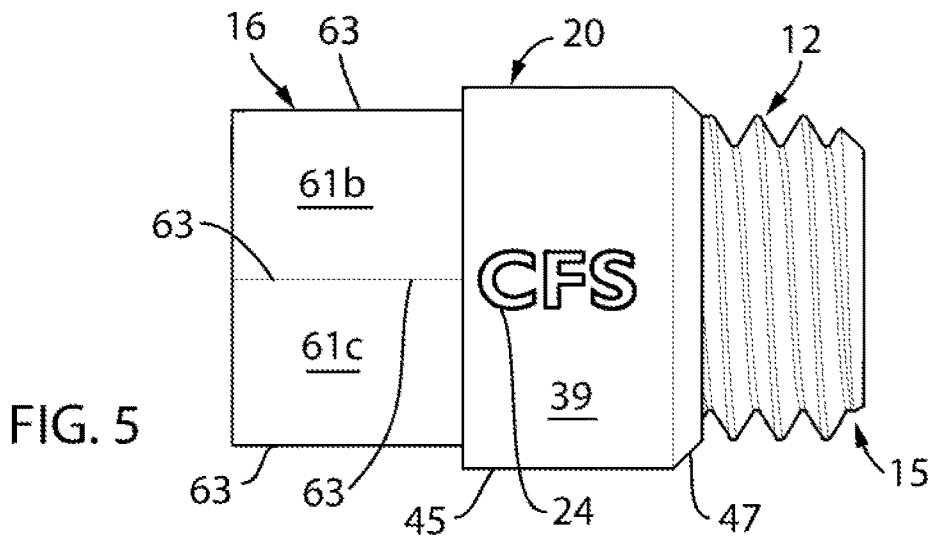
FIG. 5 is a side elevational view of a second side of the masking plug of the present invention.
Figure 6:
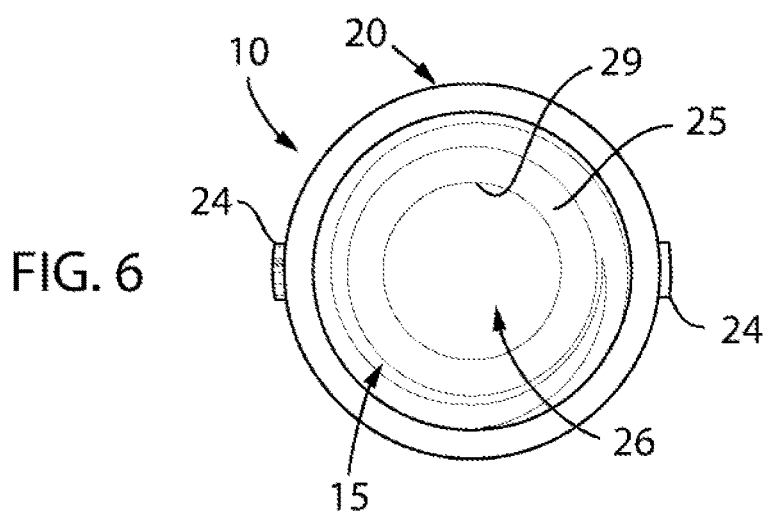
FIG. 6 is an end view of a first end of the masking plug of the present invention.
Figure 7:
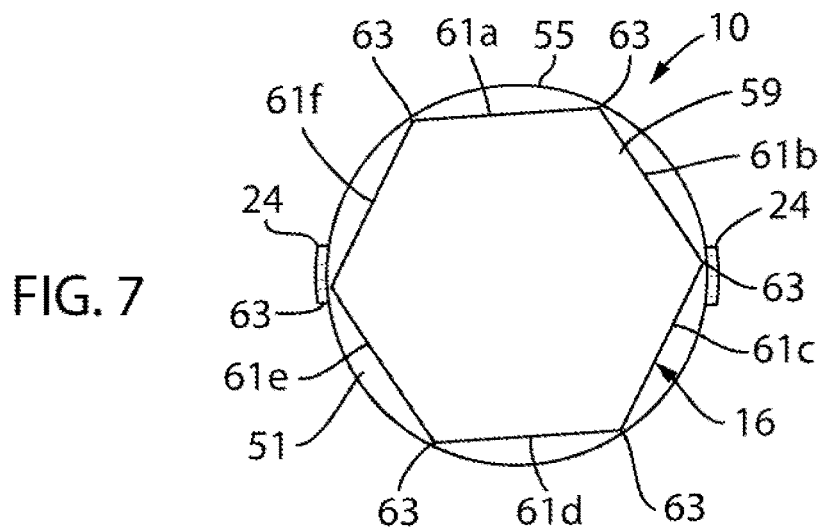
FIG. 7 is an end view of a second end of the masking plug of the present invention.
Figure 8:
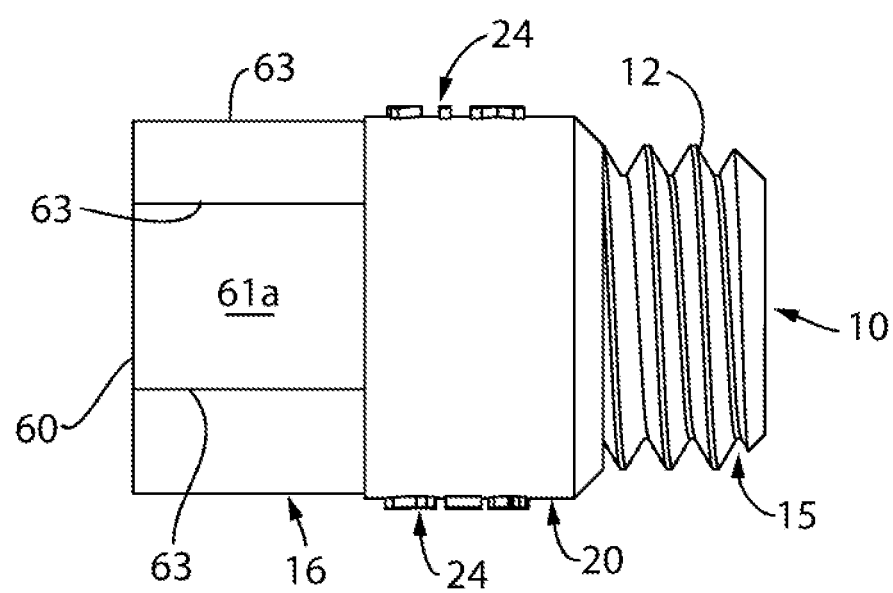
FIG. 8 is a top plan view of the masking plug of the present invention.

As best seen in FIGS. 3 and 8, first end 21 of shaft 15 terminates at a generally planar terminal surface 25 which is perpendicular to axis 17. Hollow cavity 26 extends into terminal surface 25 of shaft 15. By way of example, cavity 26 has a generally conical configuration and is defined by a conical-shaped wall 27 having an outer edge 29 that intersects terminal surface 25 and an apex 31 axially spaced from the plane including terminal surface 25. It is intended for apex 31 lie on axis 17 such that cavity 26 is centered about axis 17. As described, outer edge 29 of wall 27 defines a generally circular base of cavity 26, which is co-planar with terminal surface 25. It can be appreciated that cavity 26 may have other configurations without deviating from the scope of the present invention. By way of example, the width of the base of cavity 26 may be greater, less than, or the same as the width of cavity 26 at a location adjacent apex 31. Further, while in the depicted embodiment cavity 26 extends along the entire length of shaft 15, it can be understood that cavity 26 may extend along only a portion of the length of shaft 15, beyond the length of shaft 15 into a portion less than or equal to the length of main body 20, or beyond the length of main body 20 into head 16, without deviating from the scope of the present invention.

Referring generally to FIGS. 1-5, masking plug 10 further includes a main body 20 extending along axis 17 and having first and second ends 35 and 37, respectively. First end 35 of main body 20 terminates at first end surface 41 which is generally planar and perpendicular to axis 17. First end surface 41 extends radially from second end 23 of shaft 15 and terminates at radially outer edge 43. Radially outer edge 43 has a generally circular configuration. FIG. 8. Main body 20 further includes an outer surface 39 having an enlarged, generally cylindrical portion 45 and a chamfered portion 47. Chamfered portion 47 of outer surface 39 extends from radially outer edge 43 of first end surface 41 and intersects cylindrical portion 45 of outer surface 39 of main body 20 at edge 49.

Second end 37 of main body 20 terminates at second end surface 51 which is generally planar and perpendicular to axis 17. Second end surface 51 extends radially from first end 53 of polygonal-shaped head 16 and intersects cylindrical portion 45 of main body 20 at radially outer edge 55. Radially outer edge 53 has a generally circular configuration, FIG. 7. As best seen in FIGS. 2-5, cylindrical portion 45 of main body 20 has a diameter greater than the diameter of shaft 15, for reasons hereinafter described. It is contemplated for masking plug 10 to include indicia 24 on cylindrical portion 45 of outer surface 39 of main body 20. Indicia 24 may indicate various types of identification information such as the manufacture of masking plug 10, the part number of masking plug 10, or both. Indicia 24 may be printed two-dimensionally on cylindrical portion 45 of outer surface 39 of main body 20 or formed three-dimensionally thereon.

Head 16 extends along axis 17 and includes a second end 57 terminating a generally flat, end surface 59 which is perpendicular to axis 17. First and second ends 53 and 57, respectively, of head 16 are interconnected by outer surface 59 having a polygonal-shaped cross-section. By way of example, outer surface 59 may be formed from a plurality of adjacent, generally rectangular surfaces 61a-61f, FIG. 7. Each rectangular surface 61a-61f intersects an adjacent rectangular surface by a corresponding elongated edge 63 which is generally parallel to axis 17. In addition, each rectangular surface 61a-61f includes a first end 65 that collectively define first end 53 of head 16 and a second end 67 that collectively define second end 57 of head 16. In the depicted embodiment, head 16 has a hexagonal cross-section. However, the cross-section of head 16 may define other polygonal shapes without deviating from the scope of the present invention. It is intended form head 16 to be configured to form a mating relationship with a tool (not shown), to facilitate the installation and/or removal of masking plug 10 from threaded opening 11 in part 13.

In operation, head 16 of masking plug 10 is receiving in a bit of a tool to facilitate the insertion of masking plug 10 into threaded opening 11 in part 13. First end 21 of shaft 15 is aligned with threaded opening 11 in part 13 such that the tool may used to facilitate the threading of shaft 15 into part 13. Chamfered portion 47 of outer surface 39 acts as a stop to engage past 13 and prevent masking plug 15 from being threaded through the entirety of threaded opening 11 in part 13.

With masking plug 10 received within threaded opening 11 in part 13, part 13 is ready for a finishing operation. As heretofore described, during a conventional finishing operation, part 13 is submerged into a liquid tank and heated. As the part 13 is heated, the pressure of air trapped within the part increases. As the air pressure within part 13 increases, it can be appreciated that the air pressure exerted within cavity 26 also increases. The increased air pressure in cavity 26 causes conical-shaped wall 27 of shaft 15 to be urged radially outward away from axis 17. As conical-shaped wall 27 of shaft 15 is urged radially outward, threads 12 along outer surface 19 of shaft 15 are pressed against threaded opening 11 in part 13, thereby retaining masking plug 15 within threaded opening 11 in part 13 as the air pressure builds within part 13 during the finishing operation. It is contemplated for masking plug 10 to be fabricated from a material harder than 40 durometers, e.g. in the range of 50-100 dudrometers, and preferably 70 durometers, in order for masking plug 10 to retain sufficient rigidity to be threaded into threaded opening 11 of part 13 to be subjected to the finishing operation. Once the finishing operation has been completed, it can be appreciated that a tool may be used to facilitate the removal of masking plug 10 from part 13 by unthreading of shaft 15 from threaded opening 11.

Various modes of carrying out the invention are contemplated as being within the scope of the following claims particularly pointing out and distinctly claiming the subject matter, which is regarded as the invention.

We claim:

1. A method of masking an opening within a part during a finishing operation, comprising the steps of:
   providing a masking plug including a shaft having an outer surface with an external thread thereon;
   threading the shaft into the opening within the part, the shaft extending along an axis and having a terminal surface formed at a first end thereof;
   providing a cavity in the terminal surface of the shaft such that the cavity communicates with the opening within the part with the shaft threaded into the opening within the part, the cavity having a conical configuration and a closed end at an apex of the cavity;
   submerging the part in a liquid in a tank and heating the part with the liquid, the heating of the part causing a pressure buildup in the cavity;
   wherein the outer surface of the shaft is urged radially outward from the axis in response to the pressure buildup in the cavity during the finishing operation so as to maintain the shaft in the opening within the part.

2. The method of claim 1 wherein the cavity has a base coplanar with the terminal surface and the apex is disposed within the shaft at a location spaced from the terminal surface.

3. The method of claim 1 wherein the cavity has a first end having a first diameter and a second end spaced from the first end of the shaft having a second diameter, the second diameter being less than the first diameter.

4. The method of claim 1 comprising providing the masking plug having the cavity being centered about the axis.

5. The method of claim 1 comprising wherein the masking plug includes a head operatively connected to a second end of the shaft, the head including an outer surface having a hexagonal configuration and being configured to form a mating relationship with a tool.

6. The method of claim 1 wherein:
   the shaft includes a second end;
   the masking plug includes a head with an enlarged body interconnected to the second end of the shaft and
   the body of the head has a diameter greater than a diameter of the shaft.

7. The method of claim 1 comprising providing the masking plug having a second end of the shaft interconnected to a head with an enlarged body, the body having a diameter greater than a diameter of the head.

8. A method of masking a hole in a part during a finishing operation, comprising the steps of:
   providing a masking plug including a shaft having an outer surface with an external thread thereon;
   threading the shaft into the part, the shaft extending along an axis and having a terminal surface formed at a first end thereof; and
   providing a cavity in the terminal surface of the shaft such that the outer surface of the shaft is urged radially outward from the axis in response to a pressure buildup in the cavity during the finishing operation so as to maintain the shaft in the hole;
   wherein the masking plug includes a head located at a second end of the shaft, the head including an outer surface having a hexagonal configuration and being configured to form a mating relationship with a tool.

9. A method of masking a hole in a part during a finishing operation, comprising the steps of:
   providing a masking plug including a shaft having an outer surface with an external thread thereon;
   threading the shaft into the part, the shaft extending along an axis and having a terminal surface formed at a first end thereof; and
   providing a cavity in the terminal surface of the shaft such that the outer surface of the shaft is urged radially outward from the axis in response to a pressure buildup in the cavity during the finishing operation so as to maintain the shaft in the hole;
   wherein:
   the shaft includes a second end;
   the masking plug includes a head with an enlarged body located at the second end of the shaft; and
   the body of the head has a diameter greater than a diameter of the shaft.

* * * * *